Figure 1:
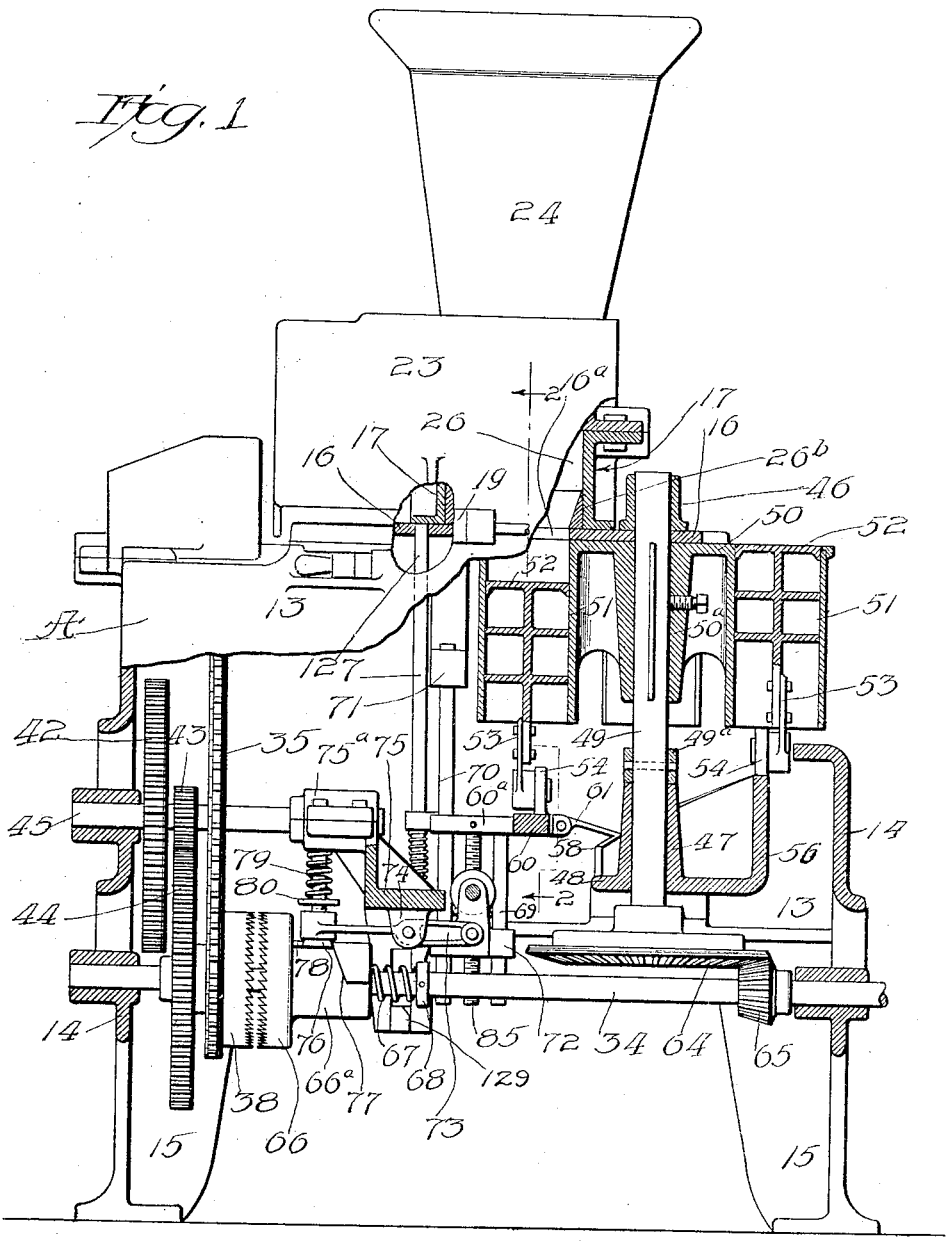

P. B. STREICH.
DOUGH SCALING MACHINE.
APPLICATION FILED MAR. 18, 1918.

1,331,130.

Patented Feb. 17, 1920.
3 SHEETS—SHEET 1.

Witness:
Harry S. Gaither

Inventor
Paul B. Streich
by Charles O. Shurvey
Atty

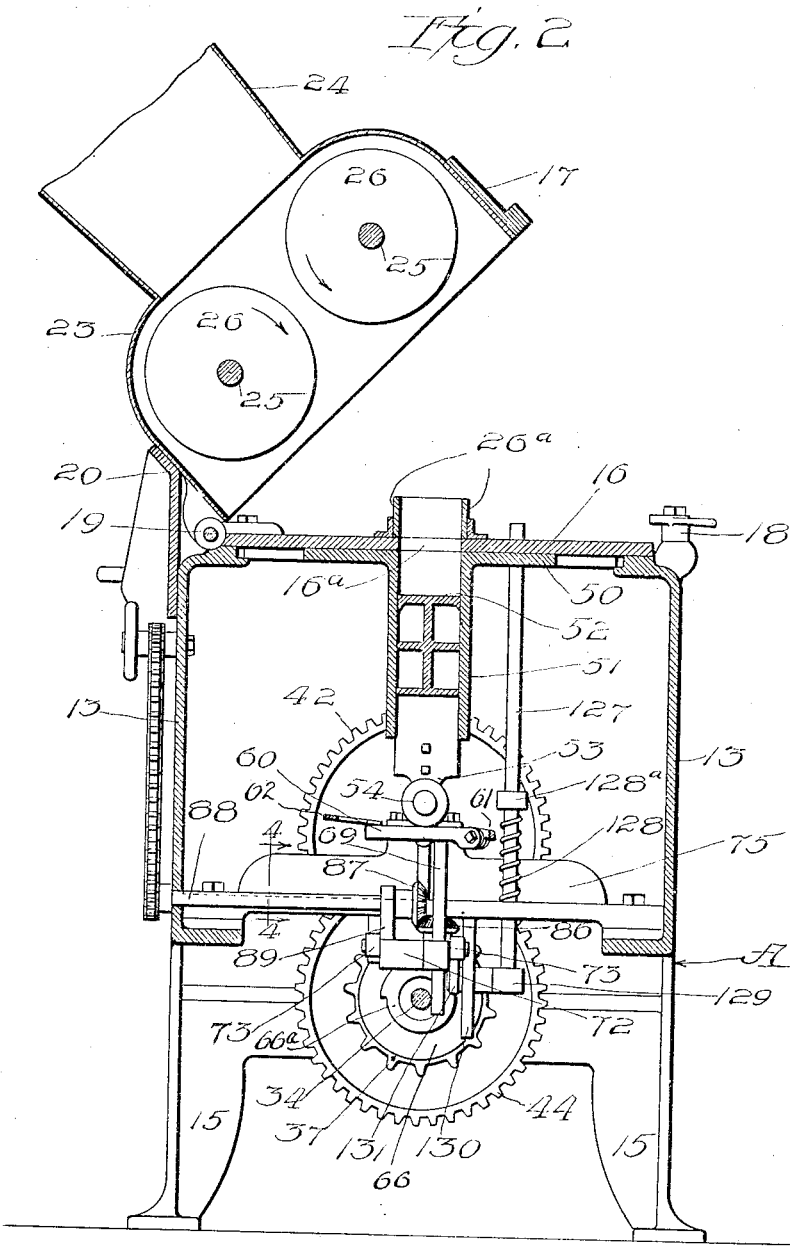

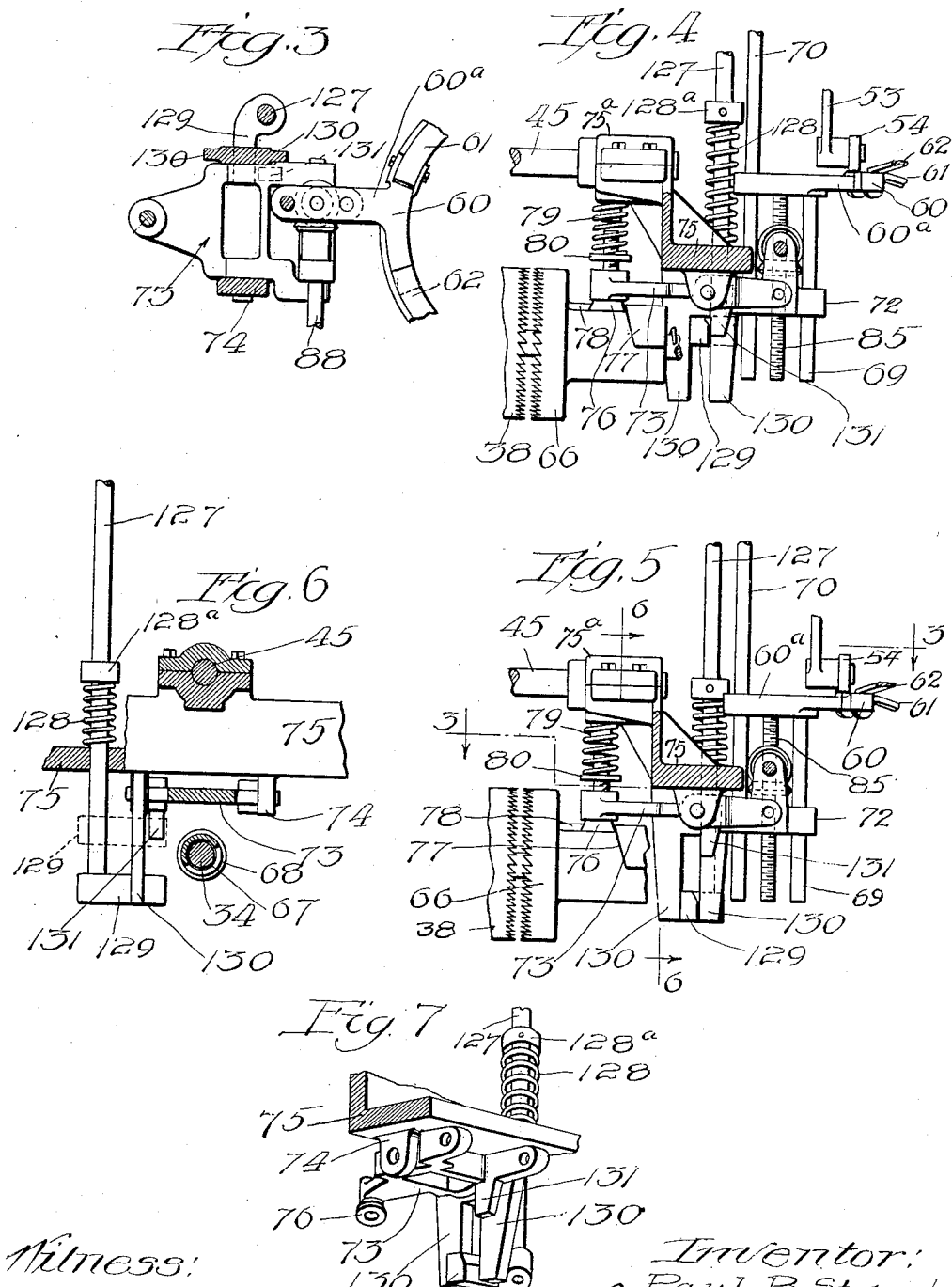

UNITED STATES PATENT OFFICE.

PAUL B. STREICH, OF JOLIET, ILLINOIS, ASSIGNOR TO THE UNION WRAPPING MACHINE COMPANY, OF JOLIET, ILLINOIS, A CORPORATION OF ILLINOIS.

DOUGH-SCALING MACHINE.

1,331,130.     Specification of Letters Patent.     Patented Feb. 17, 1920.

Application filed March 18, 1918. Serial No. 222,995.

*To all whom it may concern:*

Be it known that I, PAUL B. STREICH, a citizen of the United States, and a resident of Joliet, county of Will, and State of Illinois, have invented certain new and useful Improvements in Dough-Scaling Machines, of which the following is declared to be a full, clear, and exact description.

This invention relates to dough scaling machines of that type which employs an intermittently rotating carrier, having pockets for receiving the dough to be weighed or measured, and scale plates or plungers in the pockets that trip certain tripping mechanism to thereby start the carrier rotating mechanism. One of the objects of this invention is to provide a safety appliance for preventing injury in case the plunger which is in position to trip said tripping mechanism is accidentally depressed by the attendant. Machines of this type have a hopper and feed roll carrying frame which normally covers a feed opening in the top of the machine, but which may be moved out of such position for the purpose of cleaning or adjusting or otherwise performing work on the machine, and one of the objects of this invention is to employ said hopper and feed roll carrying frame as the medium for throwing the safety appliance out of action, whereby operation of the table rotating means is effective only when the said frame is in working position. Another object is to provide a safety appliance, which shall be automatic in operation, requiring no attention whatsoever on the part of any attendant.

With these and other objects in view, as will appear in the following specification, this invention consists in means, under the control of a movable cover for the feed opening for automatically preventing operation of the tripping mechanism of dough scaling machines whenever said cover is raised to uncover the pocket which is at the tripping position, and for releasing said tripping mechanism when the cover is lowered. The invention further consists in the several novel features hereinafter fully set forth and claimed.

The invention is clearly illustrated in the accompanying drawings, in which:—

Figure 1, is a view, partly in side elevation and partly in vertical longitudinal section of a dough scaling machine, with a simple embodiment of the present invention applied thereto; Fig. 2, is a vertical, transverse section taken on the line 2—2 of Fig. 1, showing the cover tilted back; Fig. 3, is a detail view, partly in plan and partly in horizontal section of the tripping mechanism of said machine, showing certain members of the safety device, the line of section being indicated at 3—3 in Fig. 5; Fig. 4, is a detail side view of the tripping mechanism and safety device in active position, a certain bracket being shown in section and the line of section being indicated at 4—4 of Fig. 2; Fig. 5, is a side view of the parts seen in Fig. 4, with the safety device in operative position; Fig. 6, is a detail cross section taken on line 6—6 of Fig. 5; and Fig. 7, is a perspective view of a certain trip lever of the tripping mechanism, its support and the safety device.

For the purposes of illustration, I have shown the safety device applied to a dough scaling machine of the kind illustrated and described in application of Frank Streich, filed July 23, 1917, Serial No. 182214, where the construction and operation of said machine is fully set forth.

Reference characters, corresponding to the several parts of the machine illustrated in said application are applied to the same parts on the drawings accompanying this specification.

Briefly, the dough scaling machine illustrated comprises a rectangular frame A, having side frame members 13, and end frame members 14, bolted together and formed with supporting legs 15. At the top of said frame A, is secured a stationary top plate 16, to which is secured a cover, which comprises a hopper and feed roll carrying frame 17, which rests on the top plate and may be hingedly connected thereto by hinges 19, and fastened down by a clamp 18. A bracket 20, secured to one of the side frame members 13, serves as a stop to limit the upward movement of the cover when it is raised to gain access to the top plate 16, and to its interior. A wall 23, connects the walls of the frame 17, incloses the feed rolls 26, and supports a hopper 24, thereabove. The feed rolls are mounted on shafts 25, journaled in bearings on the frame 17, and are driven to rotate in the direction indicated by the arrows in Fig. 2. The roll driving mechanism may be the same as that shown in the application above referred to. The top plate 16, has a feed opening 16ª, surrounding which is a chute 26ª, which directs the dough from the feed rolls to the feed opening 16ª.

An intermittently rotated carrier or table 50, is arranged immediately underneath and contiguous with the lower face of the top plate 16, and is secured to and supported by a shaft 49, journaled in bearings 46, 47, on the top plate 16, and a bracket 48, respectively. A collar 49ª, takes up the end thrust of the shaft 49. The bracket 48, extends transversely of the machine and is secured to the side frame members. The table is provided with pockets 51, arranged to register with and open to the feed opening 16ª, when in their filling position, and sliding in said pockets are scale plates or plungers 52, which are provided with rollers 54, carried by brackets 53, attached to the stems of the scale plates or plungers. A circular, sectional track is provided for said rollers to rest and travel upon, which track comprises a trip block 60, a track section 61, leading therefrom, a stationary section 56, and a section 62, extending between the stationary section 56, and trip block 60. The stationary section may be secured to or form a part of the bracket 48, as shown, and has an inclined tread portion which serves to raise the rollers, and the scale plates supported thereby, to eject the dough from the pockets and it has a downwardly inclined tread portion leading back to the section 62.

The table is rotated by mechanism comprising a continuously rotating member, such as a clutch member 38, and a shaft 34, intermittently rotated thereby. Conveniently said clutch member 38, may be driven from an electric motor (not shown) speed reducing gearing being interposed between the motor and clutch member 38. A train of gears 42, 43 and 44, is shown for this purpose, the gears 42, 43, being fast on a shaft 45, and the gear 44, loose on the shaft 34, but rigidly connected with the clutch member 38. The gear 42, is driven by a pinion fast on the motor shaft (not shown). A beveled pinion 65, on the shaft 34, meshing with a beveled gear 64, on the shaft 49, transmits motion from the shaft 34, to the shaft 49.

A clutch member 66, slidably but non-rotatively mounted on the shaft 34, co-acts with the clutch member 38, to impart rotation to the shaft 34, when the clutch members are in engagement with each other, and a coiled compression spring 67, interposed between a collar 68, fast on the shaft 34, and the neck 66ª, of the clutch member 66, acts to throw said clutch members together. The clutch member 66, is held out of engagement with the clutch member 38, by a lever 73, pivotally supported by lugs 74, on a bracket 75, which extends between and is secured to the side frame members 13. The lever 73, carries a roller 76, which is adapted to engage an inclined shoulder 77, on the neck 66ª, to hold the clutch member 66, out of engagement with the clutch member 38, and the inclined face of the shoulder is arranged to engage the roller 76, while the clutch members are engaged and rotating together, the inclined face serving to force the clutch member 66, out of engagement with the clutch member 38. A shoulder 78, on the neck strikes against the roller 76, and stops rotation of the shaft 34, at the proper place to leave a pocket 51, in register with the feed opening 16ª, in the top plate 16. The roller 76, is held in contact with the neck 66ª, by a spring 79, interposed between a bearing box 75ª, and a washer 80, adjustably mounted on the lever 73. It is obvious that when the roller carrying arm of the lever 73, is raised sufficiently for the roller to clear the shoulder 77, the spring 67, will throw the clutch members together, thereby setting in motion the shafts 34, 49, and table 50. This movement of the lever 73, is effected by tripping mechanism acted upon by the plungers 52.

The tripping mechanism comprises the trip block 60, and connections between the same and lever 73. The connections may comprise an arm 60ª, forming part of the trip block 60, a block 72, fulcrumed on the arm of the lever 73, and a rod 85, connecting the arm 60ª, with the block 72. Downward movement of the trip block 60, causes downward movement of the rod 85, block 72, and the end of the lever 73, connected thereto, thereby causing an upward movement of the roller carrying end of said lever 73. For the purpose of vertical adjustment of the trip block, to vary the cubical contents of the pockets above the scale plates, the rod 85, is threaded, and a beveled pinion 86, is mounted thereon and rests on the block 72. A beveled pinion 87, mounted on a shaft 88, meshes with said pinion 86. The pinion 87, may be turned by mechanism similar to that shown in the prior application referred to. Guide rods 69, 70, secured to the arm 60ª, and slidably mounted in the block 72, maintain the trip block 60, and block 72, in adjusted relation to each other and the rod 70, is guided to move in a vertical direction, in a bracket 71, secured to the top plate 16.

It is obvious that when dough is fed into the pocket in which the scale plate is resting on the trip block 60, that when the pressure of the spring 79, is overcome by the weight of the dough on the scale plate, the roller 76, will be disengaged from the shoulder 77, of the clutch member 66, the clutch members will be thrown together by the spring 67, and the table 50, given a partial revolution. The ratio of the gears 64, 65, is such that one revolution of the shaft 34, turns the shaft 49, sufficiently to bring the next pocket of the table 50, into register with the feed opening 16ª.

When the cover is raised, as seen in Fig. 2, the scale plate which accomplishes the tripping is exposed, and if an attendant inserts his hand through the feed opening 16ª, and depresses the scale plate sufficiently to actuate the tripping mechanism, the table will be given a partial revolution, and the movement is rapid so that the person's fingers are apt to be crushed between the inner wall of the pocket and edge of the feed opening 16ª. The device for preventing movement of the tripping mechanism while the cover is lifted will now be described.

Guided in the top plate 16, and bracket 75, is a vertically extending rod 127, which is yieldingly pressed in an upward direction by a spring 128, interposed between the bracket 75, and a collar 128ª, fast on the rod 127. When the cover is raised, the spring 128, moves the rod upward, bringing its upper end above the top of the top plate 16 (see Fig. 2). When the cover is lowered, it strikes the top of the rod and depresses it; this position is seen in Figs. 1, 5, 6 and 7. To the lower end of the rod 127, is secured a block or arm 129, which moves vertically in a slot formed between two lugs 130. Said lugs act to prevent the arm 129, from moving laterally. When in its upper position, the arm 129, is in position to be struck by the lever 73, to thereby prevent its movement. In the form shown, the lever 73, has a downwardly projecting lug 131, which strikes against the arm 129, when the latter is raised to its upper position, thereby preventing movement of the lever 73.

In the operation of the safety device and assuming that the clutch member 38, is being continuously driven from any suitable source of power, and that the cover is lowered, dough, being fed to the pockets as they reach the feed opening, causes the scale plates to be depressed (one at a time) thereby actuating the trip mechanism, and causing the table to be intermittently rotated. While the cover is lowered the rod 127, is held in its depressed position against the action of the spring 128, and the arm 129, is held out of the path of movement of the lug 131, of the lever 73, thereby permitting it to rock on its support. If, for any reason, the cover is raised, the spring 128, instantly moves the rod 127, upward, thereby bringing the arm 129, into the path of movement of the lug 131. If now, the scale plate which rests on the trip block is pressed downward, the lug 131, encounters the arm 129, which, being held against lateral movement by the lugs 130, positively prevents the lever 73, from being depressed, thus preventing the roller 76, from being disengaged from the shoulder 77, of the clutch member 66. Consequently, the trip mechanism remains inactive so long as the cover is raised. When the cover is again lowered it strikes against the top of the rod 127, depresses it and moves the arm 129, out of the path of movement of the lever 73.

More or less variation of the exact details of construction is possible without departing from the spirit of this invention; I desire, therefore, not to limit myself to the exact form of the construction shown and described, but intend in the following claims to point out all of the invention disclosed herein.

I claim as new, and desire to secure by Letters Patent:

1. In a dough scaling machine the combination of a stationary plate having a feed opening therein, a cover for said opening, an intermittently rotated carrier having dough receiving pockets, adapted to be successively brought into register with said feed opening, scale plates in said pockets, continuously rotating driving means, driven means for intermittently rotating said carrier, coupling mechanism for coupling and uncoupling said driving and driven means, including tripping mechanism actuated by said scale plates whereby the table is intermittently set in motion; a safety device for obstructing movement of said coupling mechanism when the cover is raised, and having a part lying in the path of the closing movement of the cover, whereby it is moved to inoperative position.

2. In a dough scaling machine the combination of a stationary plate having a feed opening therein, a cover for said opening, an intermittently rotated carrier having dough receiving pockets, adapted to be successively brought into register with said feed opening, scale plates in said pockets, continuously rotating driving means, driven means for intermittently rotating said carrier, coupling mechanism for coupling and uncoupling said driving and driven means, including tripping mechanism actuated by said scale plates whereby the table is intermittently set in motion; and a safety device having a part lying in the path of a member of said tripping mechanism and obstructing movement thereof when the cover is raised, and having a part lying in the path of the closing movement of the cover, for retracting said part of the safety device from said trip mechanism.

3. In a dough scaling machine the combination of a stationary plate having a feed opening therein, a cover for said opening, an intermittently rotated carrier having dough receiving pockets, adapted to be successively brought into register with said feed opening, scale plates in said pockets, continuously rotating driving means, driven means for intermittently rotating said carrier, coupling mechanism for coupling and uncoupling said driving and driven means, including tripping mechanism actuated by said scale plates whereby the table is intermittently set in motion; and a safety device for preventing operation of the coupling mechanism when the cover is raised, comprising a guided member lying in the path of and obstructing movement of the tripping mechanism when the cover is raised, and a rod connected with said guided member and having a part extending into the path of the closing movement of the cover, whereby said guided member is moved out of said position obstructing movement of the tripping mechanism when the cover is closed.

4. In a dough scaling machine the combination of a stationary plate having a feed opening therein, a cover for said opening, an intermittently rotated carrier having dough receiving pockets, adapted to be successively brought into register with said feed opening, scale plates in said pockets, continuously rotating driving means, driven means for intermittently rotating said carrier, coupling mechanism for coupling and uncoupling said driving and driven means, including tripping mechanism actuated by said scale plates whereby the table is intermittently set in motion; and a safety device for preventing operation of the coupling mechanism when the cover is raised, comprising an arm lying in the path of, and obstructing movement of said tripping mechanism when the cover is raised, a guide for positively preventing movement of said arm by the tripping mechanism when in said position, and a rod connected to said arm and spring pressed toward the cover, said rod having a part lying in the path of the closing movement of the cover, and adapted to be depressed thereby, whereby said arm is moved from said position, obstructing movement of said tripping mechanism, when the cover is closed.

5. In a dough scaling machine the combination of a stationary plate having a feed opening therein, a cover for said opening, an intermittently rotated carrier having dough receiving pockets, adapted to be successively brought into register with said feed opening, scale plates in said pockets, continuously rotating driving means, driven means for intermittently rotating said carrier, coupling mechanism for coupling and uncoupling said driving and driven means, including tripping mechanism actuated by said scale plates whereby the table is intermittently set in motion; and a safety device for preventing operation of the coupling mechanism when the cover is raised, comprising a guided member lying in the path of, and obstructing movement of the tripping mechanism when the cover is raised, a rod connected with said guided member, and extending through said plate, a spring for moving said rod toward said cover, and into the path of the closing movement of the cover when raised, whereby said rod is depressed when the cover is closed, and therewith the guided member is moved out of its position obstructing movement of the tripping mechanism.

6. In a dough scaling machine the combination of a stationary plate having a feed opening therein, a cover for said opening, an intermittently rotated carrier having dough receiving pockets, adapted to be successively brought into register with said feed opening, scale plates in said pockets, continuously rotating driving means, driven means for intermittently rotating said carrier, coupling mechanism for coupling and uncoupling said driving and driven means, including tripping mechanism actuated by said scale plates, and having a trip lever; an arm movable from an inactive position to an active position in which it obstructs movement of the trip lever, means for moving said arm into active position, and an operative connection between said arm and cover arranged to be moved by said cover when the latter is being closed.

7. In a dough scaling machine the combination of a stationary plate having a feed opening therein, a cover for said opening, an intermittently rotated carrier having dough receiving pockets, adapted to be successively brought into register with said feed opening, scale plates in said pockets, continuously rotating driving means, driven means for intermittently rotating said carrier, coupling mechanism for coupling and uncoupling said driving and driven means, including tripping mechanism actuated by said scale plates, and having a trip lever; an arm guided to move from an inactive position to an active position in which it obstructs movement of the trip lever, a rod connected to said arm and extending into the path of movement of the cover, whereby it is moved when the cover is being closed, said movement of the rod acting to move the arm into inactive position, and means for automatically moving said rod into the path of movement of the cover, whereby the arm is moved into active position.

8. In a dough scaling machine, a plate having a feed opening therein, a cover over said opening capable of being raised therefrom, an intermittently rotated carrier having dough receiving pockets, scale plates in said pockets, intermittently operating table rotating means, including tripping mechanism actuated by said scale plates, and a safety device having a member arranged to lie in the path of a member of the tripping mechanism when the cover is raised, and held in such position by spring pressure, and a rod secured to said member of the safety device, extending into the path of the closing movement of the cover whereby said rod and member of the safety device are depressed by said cover when closed, and the tripping mechanism is thereby released.

9. A safety device for preventing operation of clutch mechanism between the driving and driven mechanism for the carrier of dough scaling machines of the character described, comprising a stop member arranged to prevent movement of one member of the clutch, when in one position, and to permit movement thereof when in another position, means for automatically moving said stop member into said first position, a cover for the carrier, and operative connections between said cover and stop member for moving the latter to said second position when the cover is closed.

10. In a dough scaling machine, a plate having a feed opening therein, a cover over said opening, adapted to be raised therefrom, an intermittently rotated carrier having dough receiving pockets, scale plates therein, a continuously rotating driving member, intermittently rotated table rotating means, adapted to be intermittently connected to said continuously rotating driving member, tripping mechanism operated by said scale plates for releasing the clutch throwing mechanism, an arm lying in the path of a member of said tripping mechanism when the cover is raised, and spring pressed into said position, and a rod carrying said arm and moved into the path of closing movement of the cover, substantially as and for the purpose set forth.

11. In a machine of the character described, the combination with an intermittently rotated carrier, of a cover, and means controlled by the weight of the cover for preventing the carrier from being set in motion when the cover is raised.

PAUL B. STREICH.